Patented Feb. 28, 1933

1,899,389

UNITED STATES PATENT OFFICE

ARTHUR R. HITCH AND IRVIN A. EBAUGH, OF BRUNSWICK, GEORGIA, ASSIGNORS, BY MESNE ASSIGNMENTS, TO GILLICAN-CHIPLEY COMPANY, A CORPORATION OF DELAWARE

PROCESS OF PREPARING A HIGH GRADE ROSIN

No Drawing.   Application filed April 2, 1928. Serial No. 266,865.

This invention relates to a process of producing an especially high grade rosin from various forms of crude, semi refined or refined rosins.

The process provides particularly for the treatment of oleo resin or pine gum obtained from coniferous pine trees, gum rosin, wood rosin, rosin obtained from the destructive distillation of wood, previously treated coniferous tree gums and rosins of all kinds, shredded or finely divided stump wood, and also the gum, sap, rosin or related materials as they exist in the live or dead plant tissue either in the needles, leaves, bark, trunk, stump or roots before or after exudation, distillation, or extraction from the tissue of the coniferous pine trees. The material to be treated by the process of the present invention is preferably rosin-containing material that has not been obtained by extraction processes in which volatile solvents or water are employed.

At the present time there are two well known kinds of rosin, gum rosin and wood rosin. Gum rosin is made by distilling with steam the crude, semi refined or refined oleo resin or gum which exudes from the wounded living coniferous pine trees, whereby the turpentine and various volatile constituents are distilled off leaving rosin and other less volatile matter as residue. Any solids such as chips, leaves, bark, dirt, etc., in suspension in the molten rosin, are usually removed by straining. The rosin thus produced varies considerably in melting points, color, amount of turpentine, water, and other impurities. The color of the gum rosin varies from pale yellow to a very dark brown. Approximately eighty per cent of the gum rosin produced is of the darker grades (B to H) and contains objectionable material which is insoluble in the commonly used rosin solvents.

Wood rosin is obtained by first finely chopping or disintegrating the wood of the stumps, dead timber, etc., of coniferous pine trees, then subjecting this material to steam distillation for the removal of most of the turpentine and some of the pine oil, and then treating the residue with a volatile solvent to extract the resinous material. The solution is strained, and then distilled to remove volatile matter leaving rosin as residue. The rosin so obtained is highly colored due to decomposition products and extracted impurities. It also contains certain insoluble materials and has a very marked tendency to crystallize out from solvents.

In the manufacture of high grade varnishes, lacquers, soaps, sizes, ester gum, rosin oil, etc., it is highly desirable to use a rosin that has a relatively high melting point, and that is very light in color, free from all suspended material, low in turpentine and water content, easily and entirely soluble in the commonly employed solvents, and not readily crystallizable from these solvents. None of the present gum or wood rosins on the market, appear to possess all of these properties at one time.

By the process of this invention, a rosin having the above properties is produced, and lower grades of rosin are converted into rosin of very high grades, namely, "French 7 A", or better.

In general, the process includes distilling off any turpentine, oils, water, and other easily volatilized matter which may be present in the resinous material, then separating out the rosin from the residue preferably in the presence of a nonaqueous inactive gas and preferably under high vacuum, and then heating the separated rosin in the presence of any inactive gas or vapor until the desired product is obtained. A fairly high grade rosin is produced after the first two steps outlined, but the quality is improved after the third step. When all three steps are combined the use of the nonaqueous inactive gas may be omitted in the second step. If the third step is omitted, the gas is included in the second step.

With lowering of the vacuum in the second step mentioned above, to atmospheric pressure, an improved product is still obtained, but with increase of pressure there results an increase in the production of rosin oils and various other products.

The turpentine, water, and so forth, are removed from the rosin containing material by distilling with or without steam. carbon dioxide, or other inactive fluids, at pressures greater or less than atmospheric at the temperatures corresponding with such pressures. The residue is preferably distilled under a very high vacuum, from 0.01 mm. to 50 mm., at that temperature and rate which will produce the biggest yield and the lightest colored product with proper melting points. The temperature is kept as low as possible, from 200° C. to 350° C. The rate of distillation is as rapid as possible and the distillation is carried on preferably in the presence of a nonaqueous inactive gas, such as, carbon dioxide, hydrogen, nitrogen, etc. These gases should be substantially free from water. The presence of water is not objectionable but better results are obtained when no water is present.

The product so obtained is light in color, clear, free from suspended matter, turpentine, and water, and is entirely soluble in solvents. However, in order to lighten the color and to increase further the degree of solubility and also to impart the property of not readily crystallizing out in solvents, the distilled rosin is heated in an atmosphere of carbon dioxide, steam, nitrogen, hydrogen, or other inactive gases or vapors, at atmospheric or higher pressures, or under vacuum at a temperature of from 245° C. to 350° C. for a period of from ten minutes to several days or longer, depending upon the conditions of temperature and pressure, as well as the nature of the material treated. Control tests may be made from time to time, until a desirable product is obtained. The rosin is then cooled as quickly as possible and poured into containers at a relatively low temperature.

The explanation for the effect produced on rosin by heating or distilling in the presence of inactive gases to accomplish the result noted, has not been satisfactorily determined. The term inactive is defined as having substantially no chemical effect on rosin.

The following is given as an example of the process:

Any suitable solvent may or may not be added to the rosin containing material and the solution strained before placing in the stills. Addition of a solvent may be omitted when shredded stump wood, batting dross, or skimmings are treated. The temperature in the still is brought up slowly until all of the low boiling constituents are driven off. A high vacuum of from 0.01 mm. to 50 mm. is then applied to the still, and the temperature quickly raised to 200° C. to 350° C., preferably 200° C. to 285° C., at which temperatures the rosin distills over and is condensed. A better product is obtained if at this point an inactive gas substantially free from moisture, is introduced. The rosin distillate is then heated in an atmosphere of any inactive gas or vapor at a temperature of from 245° C. to 350° C., preferably around 285° C., for ten minutes or more, depending on the temperatures and pressures used and the nature of the distilled product. The higher the temperature, the shorter will be the time required. The rosin is finally cooled as quickly as possible and discharged from the heating vessel into proper containers at a relatively low temperature at least above the solidification point.

It will be noted that the treatment of the product obtained by distillation is described as simply that of heating the material in an atmosphere of inactive gases under the conditions defined.

What we claim is:—

1. A process of preparing a high grade rosin, which process consists in heating rosin-containing material selected from a group comprising shredded or finely divided stump wood; gum, sap, and rosin as they exist in the live or dead plant tissue either in the needles, leaves, bark, trunk, stump or roots from coniferous pine trees until all of the turpentine, water, and other easily volatilized matter present is distilled off leaving a residue containing rosin, heating the residue and distilling off the rosin under non-decomposing conditions in the presence of a nonaqueous inactive gas.

2. A process of preparing a high grade rosin, which process consists in heating rosin-containing material selected from a group comprising shredded or finely divided stump wood; gum, sap, and rosin as they exist in the live or dead plant tissue either in the needles, leaves, bark, trunk, stump or roots from coinferous pine trees until all of the turpentine, water, and other easily volatilized matter present is distilled off leaving a residue containing rosin, heating the residue and distilling off the rosin in the presence of a nonaqueous inactive gas under vacuum.

3. A process of preparing a high grade rosin, which process consists in heating rosin-containing material selected from a group comprising shredded or finely divided stump wood; gum, sap, and rosin as they exist in the live or dead plant tissue either in the needles, leaves, bark, trunk, stump or roots from coniferous pine trees until all of the turpentine, water, and other easily volatilized matter present is distilled off leaving a residue containing rosin, heating the residue and distilling off the rosin in the presence of a nonaqueous inactive gas under vacuum of from .01 mm. to 50 mm., and at a temperature of from 200° C. to 350° C.

4. A process of preparing a high grade rosin, which process consists in heating rosin-containing material selected from a group comprising shredded or finely divided stump wood; gum, sap, and rosin as they exist in the live or dead plant tissue either in the needles, leaves, bark, trunk, stump or roots from coniferous pine trees in the presence of an inactive gas until all of the turpentine, water, and other easily volatilized matter present is distilled off leaving a residue containing rosin, heating the residue and distilling off the rosin in the presence of a non-aqueous inactive gas.

5. A process of preparing a high grade non-crystallizing rosin, which process consists in heating the rosin-containing material until all of the turpentine, water, and other easily volatilized matter present is distilled off leaving a residue containing rosin, distilling the residue to remove the rosin, and then heating without distillation the rosin distillate obtained from the residue under non-decomposing conditions in the presence of an inactive nonaqueous gas until a clear high grade non-crystallizing rosin is obtained.

6. A process of preparing a high grade non-crystallizing rosin, which process consists in heating the rosin-containing material until all of the turpentine, water, and other easily volatilized matter present is distilled off leaving a residue containing rosin, distilling the residue to remove the rosin, and then heating without distillation the rosin distillate obtained from the residue under high vacuum in the presence of an inactive nonaqueous gas at a temperature of from 245° C. to 350° C. until a clear high grade non-crystallizing rosin is obtained.

7. A process of preparing a high grade non-crystallizing rosin, which process consists in heating rosin-containing material until all of the turpentine, water, and other easily volatilized matter present is distilled off leaving a residue containing rosin, distilling the residue to remove the rosin in the presence of a nonaqueous inactive gas, and then heating without distillation the rosin distillate obtained from the residue under nondecomposing conditions in the presence of an inactive gas until a clear high grade non-crystallizing rosin is obtained.

8. A process of preparing a high grade non-crystallizing rosin, which process consists in heating rosin-containing material until all of the turpentine, water, and other easily volatilized matter present is distilled off leaving a residue containing rosin, distilling the residue to remove the rosin in the presence of a nonaqueous inactive gas, and then heating without distillation the rosin distillate obtained from the residue under high vacuum in the presence of an inactive gas at a temperature of from 245° C. to 350° C. until a clear high grade non-crystallizing rosin is obtained.

9. A process of preparing a high grade non-crystallizing rosin, which process consists in heating rosin-containing material until all of the turpentine, water, and other easily volatilized matter present is distilled off leaving a residue containing rosin, distilling the residue to remove the rosin under vacuum in the presence of a non-aqueous inactive gas, and then heating without distillation the rosin distillate, obtained from the residue, in the presence of an inactive gas until a clear high grade non-crystallizing rosin is obtained.

10. A process of preparing a high grade non-crystallizing rosin, which process consists in heating rosin-containing material until all of the turpentine, water, and other easily volatilized matter present is distilled off leaving a residue containing rosin in the presence of an inactive gas, distilling the residue to remove the rosin under vacuum in the presence of non-aqueous inactive gas, and then heating without distillation the rosin distillate, obtained from the residue, in the presence of an inactive gas until a clear high grade non-crystallizing rosin is obtained.

11. A process of preparing a high grade rosin, which process consists in heating rosin-containing material selected from a group comprising shredded or finely divided stump wood; gum, sap, and rosin as they exist in the live or dead plant tissue either in the needles, leaves, bark, trunk, stump or roots from coniferous pine trees until all of the turpentine, water, and other easily volatilized matter present is distilled off leaving a residue containing rosin, distilling the residue to remove the rosin under non-decomposing conditions in the presence of carbon dioxide substantially free from water vapor, heating the rosin distillate obtained from the residue in the presence of an inactive gas and thereby obtaining a high grade rosin.

12. A process of preparing a high grade non-crystallizing rosin, which process consists in heating rosin-containing material until all of the turpentine, water, and other easily volatilized matter present is distilled off leaving a residue containing rosin, distilling the residue to remove the rosin in the presence of carbon dioxide substantially free from water vapor, and then heating without distillation the rosin distillate, obtained from the residue under non-decomposing conditions, in the presence of an inactive gas until a clear high grade non-crystallizing rosin is obtained.

In testimony whereof we affix our signatures.

ARTHUR R. HITCH.
IRVIN A. EBAUGH.